United States Patent [19]

St. Cyr et al.

[11] 3,900,298

[45] Aug. 19, 1975

[54] PREVENTION OF AIR POLLUTION BY USING ACTIVATED ALUMINA SOLID ADSORBENT TO REMOVE PARTICULATES OF LESS THAN 0.5 MICRONS FROM FLUE GASES

[75] Inventors: Lewis A. St. Cyr, Sandusky; Loren H. Young, Huron, both of Ohio

[73] Assignee: Vulcan Materials Company, Birmingham, Ala.

[22] Filed: July 13, 1973

[21] Appl. No.: 378,908

Related U.S. Application Data

[63] Continuation-in-part of Ser. No. 228,087, Feb. 22, 1972, Pat. No. 3,762,134, which is a continuation-in-part of Ser. No. 130,398, April 1, 1971, Pat. No. 3,750,372.

[52] U.S. Cl.......................................... 55/71; 55/72
[51] Int. Cl............................................. B01d 53/04
[58] Field of Search ............ 55/71, 72, 74, 75, 387, 55/389, 98, 99, 514, 522

[56] References Cited
UNITED STATES PATENTS

| | | | |
|---|---|---|---|
| 2,207,597 | 7/1940 | Pechukas............................. | 55/74 X |
| 3,037,337 | 5/1962 | Gardner.............................. | 55/74 X |
| 3,501,897 | 3/1970 | Van Helmen et al................ | 55/74 X |
| 3,503,184 | 3/1970 | Knapp.................................. | 55/71 |
| 3,750,372 | 8/1973 | St. Cyr et al........................... | 55/71 |

*Primary Examiner*—John Adee
*Attorney, Agent, or Firm*—Burns, Doane, Swecker & Mathis

[57] ABSTRACT

Particulates less than 0.5 microns in size are removed from flue gases by passing the flue gases into intimate contact with a solid adsorbent of activated alumina. The solid adsorbent is particularly useful in removing metal halide solids, e.g., $AlCl_3$, $KCl$, $NaCl$, and $AlF_3$, of less than 0.1 microns in size from the gaseous effluent of aluminum processing operations which utilize a gaseous chlorine treatment of molten aluminum.

2 Claims, 2 Drawing Figures

PATENTED AUG 19 1975　　3,900,298

PREVENTION OF AIR POLLUTION BY USING ACTIVATED ALUMINA SOLID ADSORBENT TO REMOVE PARTICULATES OF LESS THAN 0.5 MICRONS FROM FLUE GASES

CROSS-REFERENCE TO RELATED APPLICATION

This is a continuation-in-part of copending application Ser. No. 228,087, now Pat. No. 3,762,134, filed Feb. 22, 1972, which application in turn is a continuation-in-part of copending application Ser. No. 130,398, now Pat. No. 3,750,372 filed Apr. 1, 1971.

BACKGROUND OF THE INVENTION

1. Field of the Invention

This invention relates to the prevention or control of air pollution. More particularly, this invention relates to processes for the removal of particulates of less than 0.5 microns from the flue gases of metal processing operations to preserve or enhance the quality of the environment of mankind.

2. State of the Art

A common environmental problem in maintaining clean air and reducing air pollution today is the flue gases or gaseous effluent from metal processing facilities.

One source of particulate contaminants is the gaseous effluent discharged into the atmosphere from aluminum processing operations. Both primary and second aluminum processing operations use gaseous chlorine to purify the aluminum. The chlorine combines with the impurities in aluminum to form a slag which is skimmed from the top. During chlorination, gases and particulates are released from the molten metal and may pass into the flue stack and from there into the atmosphere. Periodic fluxing of the molten metal also contributes to the release of gases and particulates. These particulates are potential air pollutants and include inorganic metal halides such as aluminum chloride, sodium chloride, potassium chloride, magnesium chloride, and aluminum fluoride. These salts of chlorine and fluorine are typically in the form of finely divided solid particles which produce a white smoke or plume of varying density at the stack, and which may generate corrosive hydrogen chloride or hydrogen fluoride when they contact humid air.

Most of the particulates in the plume vary in size down to submicron levels, many being of an aerosol or colloid particle size, i.e., less than 0.5 microns in diameter. These aerosol-sized particles are very prone to produce fog or "white smoke" by nucleation of water droplets when such particles are introduced into a humid atmosphere. Prevention of such fogs or smokes requires very high efficiency scrubbing equipment in order to remove the aerosol-sized particles.

Various methods have been adopted in the past in an attempt to remove particulates from gaseous effluents. Conventional bag filters of cotton or other textile materials have been used, but are limited by their inability to trap aerosol-sized particles. Scrubbing with caustic liquor has also been used with some success. See, e.g., Tomany, *Light Metal Age*, October, 1968, pp. 19–20 and 36. However, such a caustic liquor scrubbing requires very high energy inputs to obtain an adequate collection efficiency for certain of the particulates, and has not been effective in removing a significant amount of the aerosol-sized metal halide particulates. Other methods which have been suggested for the removal of entrained solids in gaseous effluents include "raining" large amounts of an inert contact material such as coke downwardly through the gaseous effluent. See, for example, U.S. Pat. No. 3,220,165. Similarly, a method of separating gaseous mixtures of metal chlorides using active carbon has been suggested. See, for example, U.S. Pat. No. 3,388,993. However, neither coke nor active carbon has been effective for removing the metal halide particulates of less than 0.5 microns in size from the gaseous effluent of aluminum processing plants. Calcium oxide (lime) is similarly ineffective.

It has also been proposed (see U.S. Pat. No. 3,503,184) to contact gaseous effluent from a primary aluminum cell with a combined system of a bed of finely divided alumina pellets followed by a conventional bag filter. Since the bag filter itself is limited by an inability to trap aerosol-sized particles, the alumina bed which is the first portion of the system contacted by the effluent, acts as a gross collector of solids necessarily of a relatively large (e.g., greater than 0.6 micron) size.

Prior applications Ser. Nos. 130,398 and 228,087 disclose and claim methods for the prevention of air pollution by removing aerosol-sized particulates of less than 0.5 microns in size from flue gases by contacting the said particulate-containing gas with a solid, inorganic, highly adsorbent material such as hardened hydraulic cement (Ser. No. 228,087) or a material selected from the group consisting of calcium sulfate, zeolitic molecular sieves, dicalcium orthophosphate, clays, slates and mixtures thereof (Ser. No. 130,398).

SUMMARY OF THE INVENTION

Accordingly, a primary object of the present invention is to prevent or alleviate the above-discussed problems associated with the prior art.

Another object is to provide a novel process or method for the effective removal of particulates of less than 0.5 microns from gaseous effluents.

A further object of the invention is to provide a process for the effective removal of particulates of less than 0.5 microns from gaseous effluents by contacting the effluents with a solid inorganic material.

Another object of the present invention is to prevent or reduce the intensity of white smoke issuing from aluminum processing operations which treat molten aluminum with gaseous chlorine.

In accordance with one aspect of the present invention, particulates of less than 0.5 microns in size are removed from gaseous effluents by contacting the effluent with an activated alumina adsorbent material.

In accordance with a particularly advantageous aspect of the present invention, entrained metal halide solids of less than 0.1 microns in size are effectively removed from the flue gas of an aluminum processing operation which utilizes or employs a gaseous chlorine treatment of molten aluminum by passing the flue gas through a bed of activated alumina pellets.

A primary feature of the present invention is the surprising discovery that a solid material such as activated alumina is effective in removing aerosol-sized particulates such as the metal halide solids entrained in flue gases from aluminum furnaces. Heretofore, it was widely believed that solid adsorbents would be generally ineffective in removing submicron particulates (except possibly at prohibitively high pressure drops with concomittant high energy requirements) and that liquid adsorbents, such as caustic or alkaline solutions (which still can allow white smoke and also require high energy expenditures), were needed.

Other objects, aspects and advantages of the present invention will become apparent to one skilled in the art in view of the following description of the preferred embodiments when read in conjunction with the accompanying drawings.

DESCRIPTION OF PREFERRED EMBODIMENTS

Figure 1:
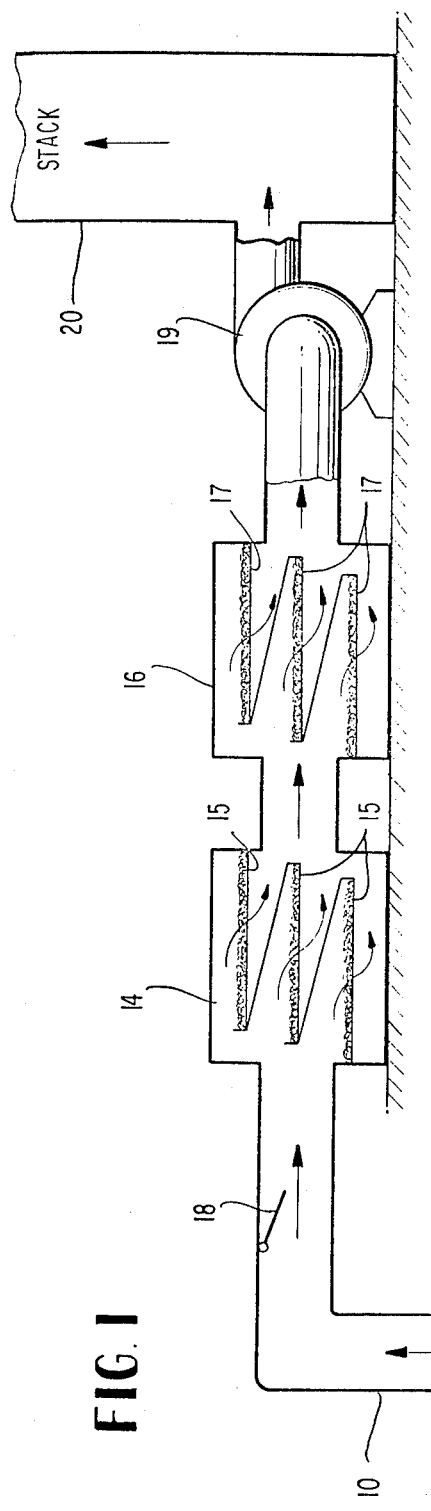
FIG. 1 is a view in elevation, partly diagrammatic and partly in section, illustrating a solid adsorbent tray scrubber unit in conjunction with a secondary aluminum processing operation.

Referring to FIG. 1, fumes consisting of hot gases and particulate matter issue from molten aluminum 1 in a secondary aluminum melting furnace 2. The aluminum melting furnace 2 comprises a combustion chamber 3 and an open hearth 4 where aluminum scrap or the like can be placed into the furnace. A burner 5 in the combustion chamber 3 is used to maintain the metal above its melting point and to maintain a reducing (nonoxidizing) atmosphere over the molten metal. A layer 6 of flux material such as a NaCl-KCl eutectic composition may be provided to prevent the formation of oxides and to absorb or gather impurities released from the metal during processing. A gaseous chlorine distributing pipe 7 may be immersed into the melt 1 at the open hearth section 4. The gaseous chlorine is supplied to the pipe 7 from a pressure vessel (not shown) through a flexible conduit 8. A suitable valve (not shown) in line 8 may permit metering of the amount of gaseous chlorine fed into the melt 1. A hood 9 is provided to direct fumes from the open hearth into a flue duct 10. Similarly, fumes from the combustion chamber 3 are directed through a duct 11 into flue duct 10. The fumes may be passed via ducts 10 and 11 through a preliminary filter unit 14 which may be composed of baffled foraminous trays 15 of, for example, 100 mesh silica sand, 1 to 50 cm. deep, whereby soot, organic matter, and other coarse particulates generally having a particle size greater than about 1 micron may be removed. Thereafter, the filtered flue gas may be passed through a solid adsorbent unit 16 which may be composed of baffled foraminous trays 17 containing particulate highly adsorbent activated alumina at a bed depth of, for example, 5 to 50 cm. Thereafter, the flue gas may be passed into a natural draft stack 20. A blower 19 may be provided to maintain a flue gas flow rate of, for example, about 1,000 to 1,000,000 liters per minute.

Generally, the temperatures of fumes issuing from the aluminum furnace 2 will range from about 80°C. in the open hearth section 4 to about 800°C. in the combustion chamber 3. Therefore, if the flue gas temperature immediately upstream of the preliminary filter unit 14 is still relatively high, e.g., 500°C., a damper 18 may be provided in the flue duct 10 to mix or bleed-in a gas, such as air, at a lower temperature, conveniently ambient temperature, e.g., 25°C.

Figure 2:
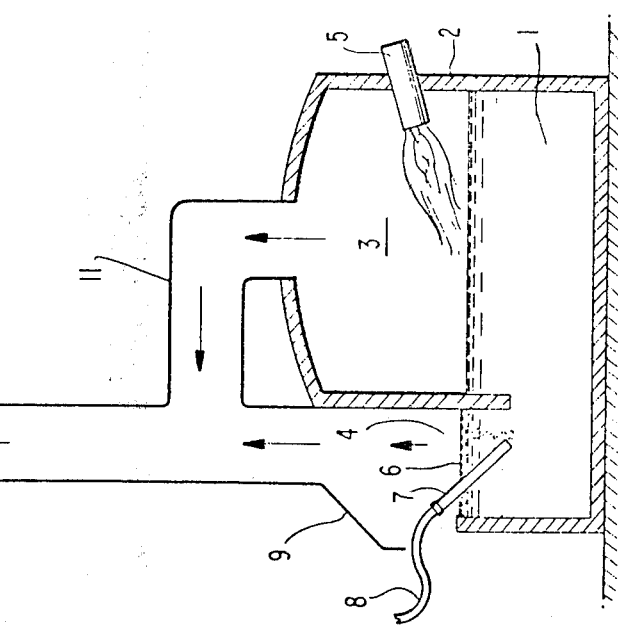
FIG. 2 is a view in elevation, partly diagrammatic and partly in section, illustrating a solid adsorbent bag scrubber unit for gaseous effluent.

Referring to FIG. 2, as an alternative or in conjunction with the solid adsorbent tray unit 16 shown in FIG. 1, a solid adsorbent bag unit 30 composed of sereral inverted bags 31 supported on a reticulated framework (not shown) may be used. The bags themselves may be of any woven or non-woven textile material such as cotton which is capable of withstanding the temperatures of the flue gas which may enter at inlet port 32, pass up through the bags 31 and through outlet port 33 to the stack. The solid adsorbent material may be applied to the bags 31 in a number of ways. For example, the bags may be made of quilted material, i.e., two layers of stitched cloth, with the solid adsorbent material as a filling being held between the layers by the stitching. Alternatively, the activated alumina solid adsorbent material may be dispersed in an aqueous medium to a paste-like consistency and then coated onto the interior of the bags 31. Alternatively the alumina may be applied by injection of finely divided alumina into the gas stream entering the bags.

The activated alumina solid adsorbent material found useful in the present invention exhibits high affinity for particulates or solids of less than 0.5 microns in size, e.g., 0.001 to 0.05 microns, and has particularly high affinity for particulates less than 0.1 microns in size.

Activated alumina is a highly porous, granular form of aluminum oxide, usually produced by heating hydrated alumina to a temperature sufficient to drive off most of the combined water, and is per se well known.

In general, any of the widely known gas-solid contacting procedures or methods which will intimately contact or mix the flue gas or gaseous effluent with the activated alumina solid adsorbent material may be sufficient to remove the aerosol-sized particulates.

For example, intimate contacting of the gaseous effluent and the solid adsorbent material may be achieved by using semicontinuous units involving fixed beds of the adsorbent through which the flue gases pass; continuous units which provide for countercurrent or cocurrent movement of solid adsorbent material and flue gas, or, if desired, batch units.

Preferably, semicontinuous units involving fixed or substantially stationary beds, with the solid adsorbent material in granular form placed on one or more trays or columns, are used. Slight movement of the bed material may be effected either continuously or intermittently to prevent or alleviate any clogging and/or "channeling", and/or to allow for gradual replacement of spent to partially spent solid adsorbent material with fresh solid adsorbent material.

If more than one bed of activated alumina solid adsorbent material is used, the beds may be placed in a series or a parallel arrangement, or a combination of both.

When the activated alumina solid adsorbent material is used in granular form, the size of the granules or particles may be from about 100 to 10,000 microns (1 cm.), and more typically about 300 to 5,000 microns.

The term "granule" is used herein to include material which may be in granulated, pelleted, pulverized, crumbled, crushed or in otherwise comminuted form, so that flue gases may be passed therethrough in tortuous paths, thus allowing intimate contact of the gases with the solid material while minimizing pressure drop across the scrubber unit.

When the solid adsorbent material is used in granular form, bed depth may be from about 1 cm. to about 100 cm., and more typically about 5 cm. to about 50 cm., as measured in the general direction of flow therethrough of flue gas.

Of course, the pressure drop across the bed of solid adsorbent material is as small as possible, preferably less than about 1 cm. of mercury, but which may be higher, e.g., from above 1 cm. mercury to about 10 cm. mercury if desired.

The flue gas may be passed through a static or fixed bed of the solid adsorbent material and under fluidizing or non-fluidizing conditions.

To avoid or substantially lessen the possibility of the flue gas picking up or having entrained therein particles of the solid adsorbent material, non-fluidizing conditions are preferred.

Mixed beds of the activated alumina solid adsorbent material with the solid adsorbent materials claimed in copending applications Ser. No. 228,087 and Ser. No. 130,398, which materials are taken from the group consisting of hardened hydraulic cement, calcium sulfate, zeolitic molecular sieves, dicalcium orthophosphate, clays, slates and mixtures thereof are also contemplated. For example, the flue gas may first be passed through a bed of calcium sulfate and thereafter be passed through a bed of the activated alumina. Or, the flue gas may be passed through one or more beds, each containing a mixture, e.g., 50% calcium sulfate, 50% activated alumina, of activated alumina and one or more of the other said solid adsorbent materials.

The beds of the activated alumina solid adsorbent material may also contain an acid-removing material such as calcium hydroxide, calcium oxide, calcium carbonate, or sodium carbonate, the acid-removing material being admixed with the activated alumina solid adsorbent material of the present invention for the purpose of removing at least a portion of any acid gases such as hydrogen chloride or hydrogen fluoride which may be present in the flue gas.

The flue gas may be contacted with the activated alumina solid adsorbent material at any temperature at which the activated alumina is sufficiently active to remove the aerosol-sized particulates. Typically, the activated alumina solid adsorbent material is contacted at flue gas temperatures which may range from several hundred degrees, e.g., 800°C., near the furnace or melt, to more near ambient temperature, e.g., 100°C., near the top of the stack or end of the flue.

Preferably, the flue gas temperature at about the point of initial contact with the activated alumina solid adsorbent material is from above about 100°C. to below about 500°C.

In the range of 110°C. to 500°C., activated alumina has been found to be particularly useful in removing metal halide solids of less than 0.1 microns from gaseous effluents, i.e., flue gases, issuing or resulting from aluminum processing operations which utilize a gaseous chlorine treatment of molten aluminum.

The quantity of aerosol-sized metal halide particulates in the gaseous effluent of aluminum processing furnaces may vary widely depending upon, for example, whether or not chlorination of the impure aluminum is actually occurring, chlorination conditions, and similar factors. The quantity at any given time may range, for example, from 2 to 20,000 ppm.

Scrubbing the gaseous effluent with the activated alumina solid adsorbent material of the present invention may remove at least about 50%, and more typically at least about 90%, of the aerosol-sized metal halide particulates.

The gaseous effluent being treated may also contain gross contaminants, such as inorganic salts and oxides, soot, and organic material comprising particulates greater than 0.5 microns in size. Such gross contaminants, which typically are greater than 1 micron in size, may be removed by one or more coarse adsorbents, screens, or filters, e.g., fixed beds of sand or rocks, cloth screens, low energy liquid scrubbers, or cyclone separators. Such gross contaminants are preferably removed prior to contacting the flue gas with the activated alumina solid adsorbent material.

As indicated above, hydrogen chloride, hydrogen fluoride, and chlorine gas may also be present in the gaseous effluent of aluminum processing furnaces. Such potential pollutants may also be removed by "wet" scrubbing the gaseous effluent with aqueous alkaline solutions or the like, either prior or subsequent to contacting the gaseous effluent with the activated alumina solid adsorbent material, but prior to expelling or venting the flue gas to the atmosphere.

Such wet scrubbers are described, for example, in "Gas Collection, Cleaning and Control at Lako Lundsvall Works" E. M. Brenner, paper number A70-14; and "Systems for Gas Collection and Cleaning in Electrolytic Cells of Montecatini Edison Aluminum Plants", G. Callaioli et al., paper number A70-23, which were presented at the February 16–19, 1970 meeting of the Metallurgical Society of the A.I.M.E. at Denver, Col., and are available from the Metallurgical Society of the A.I.M.E., 345 East 47th Street, New York, N.Y. 10017. Both of these papers are incorporated herein by reference.

For further description of details of typical solids-fluids containing equipment and general engineering design considerations, including a discussion of gas-solids fluidized and non-fluidized systems, various known types of bag filters, coarse granular bed filters, and other screening techniques, see Perry's *Chemical Engineers Handbook*, McGraw-Hill, 4th Ed. (1963), which is incorporated herein by reference.

The mesh or particle sizes referred to herein are based on the U.S. Sieve Series (ASTM E-11-61), with International Test Sieve Series (in microns) equivalents also being given wherever possible. Whenever a plus mesh-minus mesh designation is given, the material passing through one screening surface (minus mesh) and/or being retained on another screening surface (plus mesh) is the material so identified.

The present invention is further illustrated by the following examples; all parts, percentages and ratios in the examples as well as in other parts of the specification and in the claims are by weight unless otherwise indicated.

EXAMPLE I

A run was conducted in which the scrubber unit consisted of a single fixed tray containing a bed 53 cm. deep of activated alumina granules of −4/ +8 mesh size. The source of the gaseous effluent was a simulated secondary aluminum processing furnace comprising a natural gas-fired vessel containing sodium chloride-potassium chloride flux material. The temperature of the gaseous effluent passing through the bed was about 170°C., and the pressure drop across the scrubber unit was about 0.037 cm. mercury.

Samples of the gaseous effluent were simultaneously taken from ports located upstream and downstream of the tray scrubber unit using Gilman type A filter pads to collect any aerosol-sized particles in the sample.

The Gilman type A filter pads are manufactured from microsized filaments of glass and are treated in a muffle furnace to remove any trace amounts of organic fiber contaminant. These filters are tested to a minimum 99.7% collection efficiency for particles larger than 0.3 microns as measured by the Dioctyl Phthalate Penetration (DOP) test. The efficiency of these filter pads is greater than 98% for particles as small as 0.05 microns, and is correspondingly lower for more minute particles.

After one hour of operation, chloride analysis of samples taken as described above showed the following results:

| Before Scrubber Unit | After Scrubber Unit |
| --- | --- |
| 1740 µg/l | 580 µg/l |

EXAMPLE II

A run was conducted in which the scrubber unit consisted of a single fixed tray containing a bed 21 in. deep of activated alumina pellets of −4/+8 mesh size. The source of the gaseous effluent was a simulated secondary aluminum processing furnace comprising a natural gas fired vessel containing sodium chloride - potassium chloride flux material. The temperature of the gaseous effluent passing through the bed was about 150°C. while the flow rate was such that the pressure drop across the bed was about 8 in. water. After 30 min. of operation, analyses as in Example I of aerosol sized chlorides showed the following results:

| Before Scrubber Unit | After Scrubber Unit |
| --- | --- |
| 200 mg/l | 66 mg/l |

The following comparison run illustrates the superiority of the solid adsorbent of the present invention compared to carborundum (an inactive form of alumina).

Comparison Run

Example II was repeated except that the bed consisted of 25 inches of −4/+8 mesh carborundum (an inactive form of alumina). Chloride analyses as in Example I gave these results:

| Before Scrubber Unit | After Scrubber Unit |
| --- | --- |
| 270 mg/l | 167 mg/l |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. An air pollution control process for the prevention of white smoke in the atmosphere and caused by finely divided metal halide solids having a particle size of less than 0.1 microns from a gaseous effluent of an aluminum processing operation utilizing a gaseous chlorine treatment of molten aluminum, which process comprises treating the gaseous effluent to remove entrained solids having a particle size greater than 1 micron; and passing the treated effluent into intimate contact with and through a bed of granular activated alumina, the granular alumina having a size of from 300 to 5,000 microns and the bed having a depth of from about 5 to 50 centimeters, at a temperature between about 110°C. and about 500°C. to remove a quantity of the metal halide solids having a particle size of less than 0.1 microns at least sufficient to prevent formation of the white smoke.

2. The process of claim 1 further comprising treating the gaseous effluent to remove hydrogen chloride, hydrogen fluoride and chlorine gas.

* * * * *

UNITED STATES PATENT OFFICE
CERTIFICATE OF CORRECTION

Patent No. 3,900,298　　　　　Dated August 19, 1975

Inventor(s) Lewis A. St. Cyr, et al

It is certified that error appears in the above-identified patent and that said Letters Patent are hereby corrected as shown below:

The term of this patent subsequent to August 7, 1990, has been disclaimed.

Signed and Sealed this

Twentieth Day of July 1976

[SEAL]

*Attest:*

RUTH C. MASON
*Attesting Officer*

C. MARSHALL DANN
*Commissioner of Patents and Trademarks*